Dec. 9, 1969  J. E. RAIDEL  3,482,853
TRAILER DOLLY
Filed July 31, 1967  2 Sheets-Sheet 1
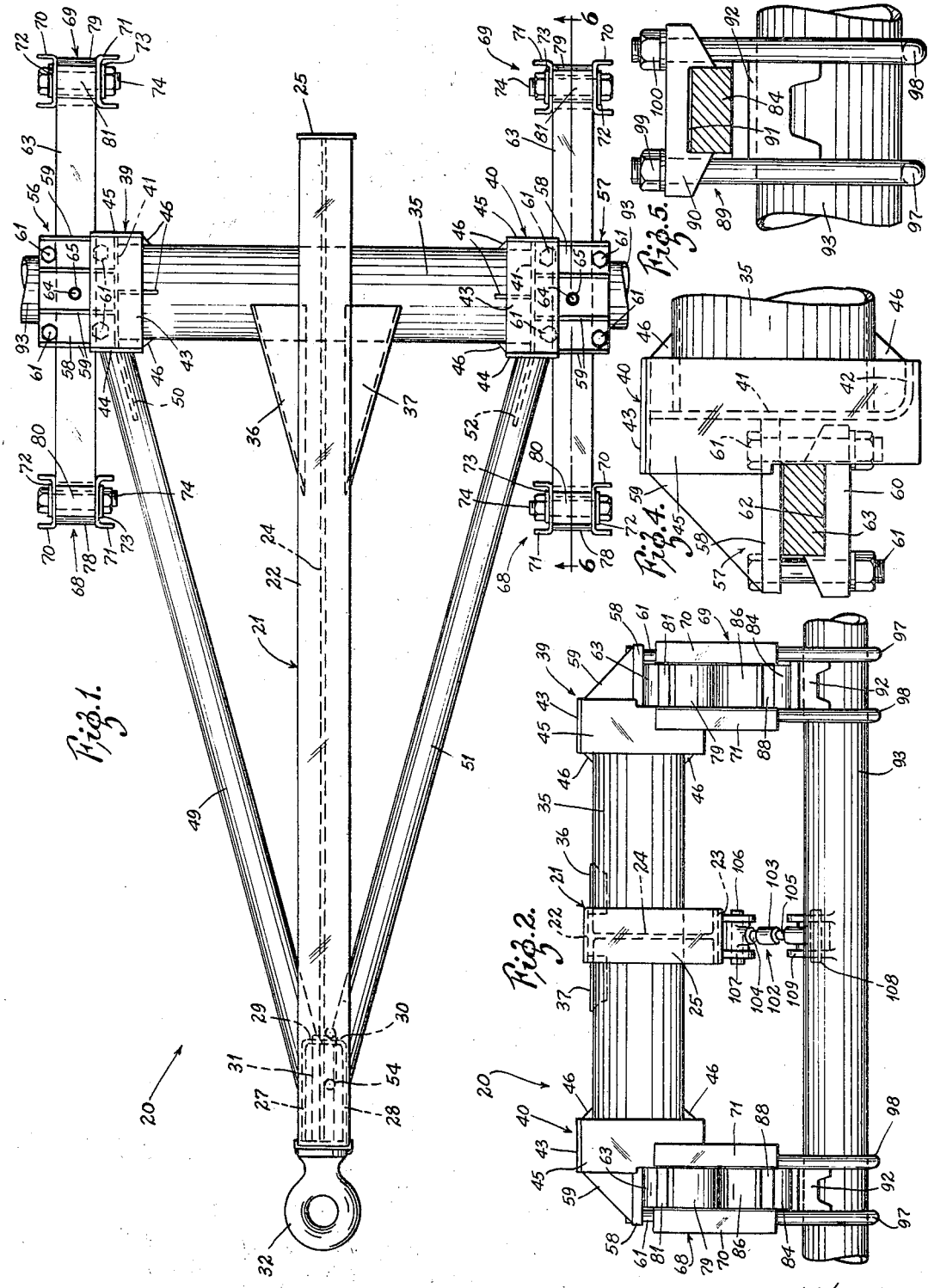
INVENTOR:
JOHN E. RAIDEL,
BY Kingsland, Rogers, Ezell, Eilers & Robbins
ATTORNEYS

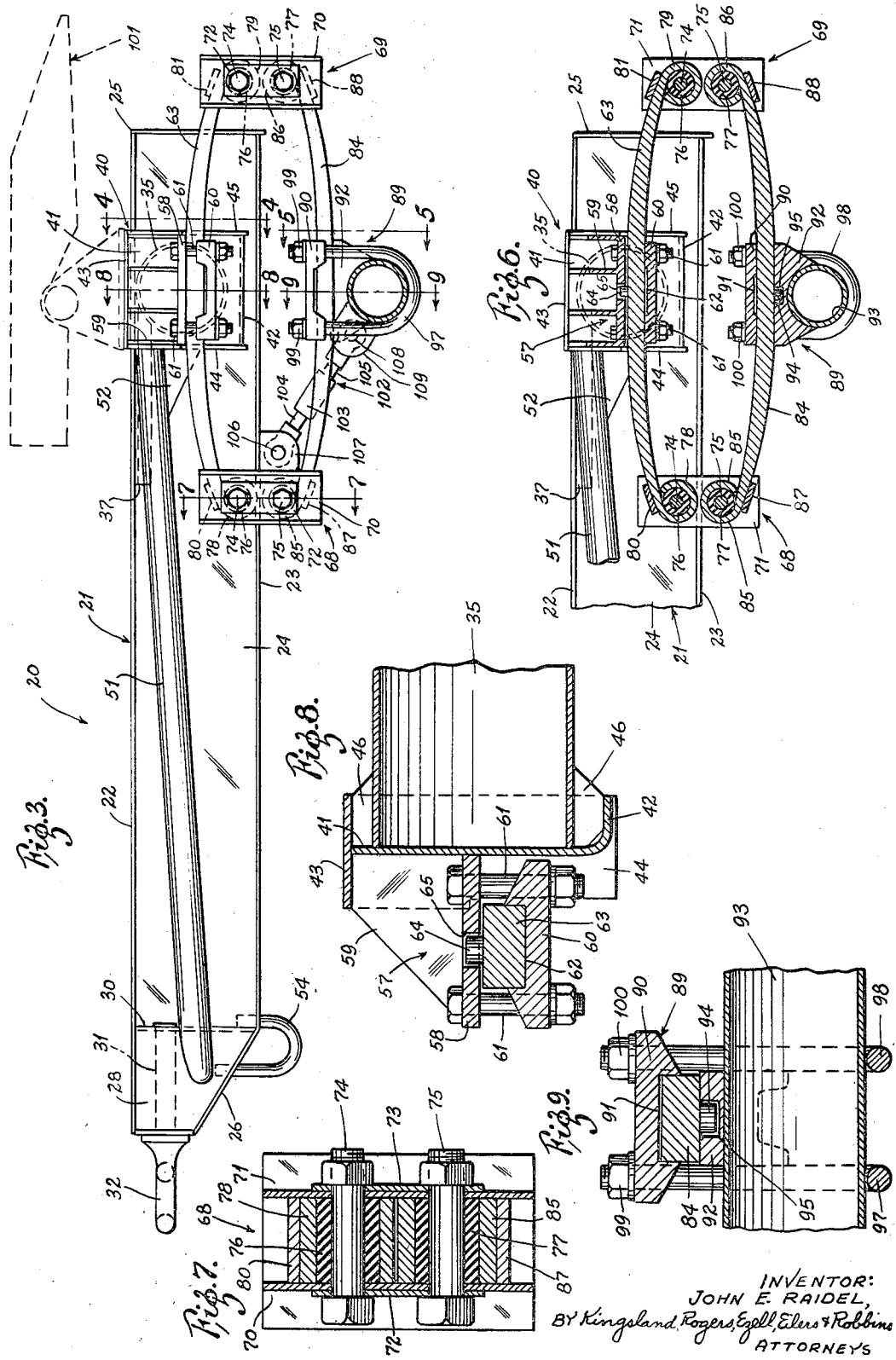

United States Patent Office 3,482,853
Patented Dec. 9, 1969

3,482,853
TRAILER DOLLY
John E. Raidel, Rte. 9, Box 400–M,
Springfield, Mo. 65801
Filed July 31, 1967, Ser. No. 657,237
Int. Cl. B60d 1/08, 1/14
U.S. Cl. 280—124
8 Claims

ABSTRACT OF THE DISCLOSURE

A dolly assembly for a truck trailer having a dual leaf spring assembly for greater load carrying capacity and softer riding quality. The dual leaf spring assembly comprises two oppositely oriented leaf springs mounted between the trailer axle and the dolly rail with the ends of the leaf springs connected to shackle assemblies, thereby giving twice the deflection of a single leaf spring. Stops between the shackles and springs restrict rotation of the axle.

BRIEF DESCRIPTION OF THE INVENTION

The frame of this dolly assembly comprises a central I-beam flanked by reinforcing rods. At their forward ends, the I-beam and the rods are joined together. A body rail extends through the rearward end of the I-beam, and a pedestal assembly is connected to each end of the body rail. The body rail may be hollow, if desired, with the pedestal assemblies closing the ends of the body rail and enabling it to act as the air chamber for the air brake system of the trailer.

A leaf spring assembly is connected between each pedestal assembly and the axle of the trailer. Each leaf spring assembly comprises a pair of oppositely oriented upper and lower leaf springs. The center of the upper leaf spring is clamped to the pedestal assembly. The center of the lower leaf spring is clamped to the axle. The forward ends of the leaf springs are clamped to a common shackle assembly, and the rearward ends of the leaf springs are clamped to another common shackle assembly. Therefore, as the loads carried by the trailer vary, they are supported by the two leaf springs to give added load carrying capacity. At the same time, because of the way the leaf springs are mounted, they provide double the deflection of a single leaf spring and thereby greatly enhance the riding qualities of the trailer. There are stops between the shackle assemblies and the leaf springs to restrict rotation of the axle.

DESCRIPTION OF THE DRAWINGS

FIGURE 1 is a top plan view of the dolly assembly;
FIGURE 2 is an end elevation view of the dolly assembly as viewed from the right side of FIGURE 1;
FIGURE 3 is a side elevation view of the dolly assembly;
FIGURE 4 is an enlarged fragmentary view in section taken along the line 4—4 of FIGURE 3;
FIGURE 5 is an enlarged view in section taken along the line 5—5 of FIGURE 3;
FIGURE 6 is a view in section taken along the line 6—6 of FIGURE 1;
FIGURE 7 is an enlarged view in section taken along the line 7—7 of FIGURE 3;
FIGURE 8 is an enlarged fragmentary view in section taken along the line 8—8 of FIGURE 3; and
FIGURE 9 is an enlarged view in section taken along the line 9—9 of FIGURE 3.

DETAILED DESCRIPTION OF THE INVENTION

This dolly assembly 20 comprises a central I-beam or other structure body 21 having top and bottom plates 22 and 23 and a central vertical web 24. A plate 25 is welded to the rearward end of the I-beam 21. At the forward end of the I-beam 21, the bottom plate 23 has an upwardly inclined section 26. A pair of plates 27 and 28 having inwardly curved flanges 29 and 30 are welded between the top plate 21 and the bottom plate section 26 to provide increased strength to support the stem 31 of a drawbar eye 32.

A hollow cylindrical body rail 35 extends transversely of the central I-beam 21 through an appropriate opening in the vertical web 24. A pair of gusset plates 36 and 37 are welded to the I-beam 21 and to the body rail 35.

A pair of pedestal assemblies 39 and 40 are mounted at opposite ends of the body rail 35. Each pedestal assembly 39 and 40 comprises a vertical plate 41 welded to the entire perimeter of the adjacent end of the body rail 35 to give the body rail 35 a fluid-tight enclosure. This permits the body rail 35 to perform the added function of acting as the air tank for the truck air brakes. The lower end 42 of the plate 41 is bent inwardly, as shown in FIGURE 8, and at the upper edge of the plate 41 a horizontal plate 43 is welded. Forward and rearward plates 44 and 45 are welded to the forward and and rearward edges of the top plate 43 and the plate 41. There are several gussets 46 welded to the pedestals 39 and 40 and to the body rail 35.

A tubular brace 49 is welded to the front plate 44 of the pedestal assembly 39 and to the side and end plates 27 and 29 which are welded to the I-beam 21. The connection of the tubular brace 49 to the front plate 44 is reinforced with a gusset 50. A similar tubular brace 51 is welded to the front plate 44 of the pedestal assembly 40, reinforced with a gusset plate 52, and the forward end of the brace 51 is welded to the plates 28 and 30 that are welded to the I-beam 21.

A safety eye 54 is welded to the I-beam 21 adjacent its forward end.

Spring clamps 56 and 57 are supported at the outer sides of the pedestal assemblies 39 and 40, respectively. As shown in FIGURES 6 and 8, the spring clamp 57 (which is identical to the spring clamp 56) comprises a horizontal top plate 58 welded at its side edge to the plate 41 and supported by a plurality of gussets 59, which are also welded in place. A spring seat block 60 is supported below the top plate 58 by four bolts 61. The block 60 has a recess 62 in its upper side for receiving a leaf spring 63 which is clamped tightly between the top plate 58 and the block 60 when the bolts 61 are tightened. There is a pin 64 welded to and extending upwardly from the leaf spring 63 into a locator hole 65 in the top plate 58.

At the forward and rearward ends of each of the two leaf springs 63, there are a pair of sackle assemblies 68 and 69, respectively, the details of one such shackle assembly being illustrated in FIGURE 7. As shown in FIGURE 7 and in FIGURES 1 and 6, the shackle assembly 68 comprises a pair of side channels 70 and 71 bounded by plates 72 and 73 and having bolts 74 and 75 extending through them. A rubber bushing 76 is mounted on the bolt 74 and a similar rubber bushing 77 is mounted on the bolt 75. The forward end 78 of the leaf spring 63 is curved about the bushing 76 of the shackle assembly 68, and the rearward end 79 of the leaf spring 63 is curved about the bushing 76 of the shackle assembly 69. A plate 80 is welded between the channel members 70 and 71 and bears against the upper side of the leaf spring 63 as illustrated in FIGURE 6. A similar plate 81 bears against the upper side of the leaf spring 63, and is welded between the channel members 70 and 71.

Another leaf spring 84 is oriented opposite to the leaf spring 63. The forward end 85 of the leaf spring 84 is wrapped about the bushing 77 of the shackle assembly 68 and the rearward end 86 of the leaf spring 84 is wrapped about the bushing 77 of the shackle assembly 69. A plate 87 is welded between the channel members 70 and 71 and bears against the lower side of the leaf spring 84. A similar plate 88 is welded between the channel members 70 and 71 of the shackle assembly 69 and bears against the lower side of the leaf spring 84.

An axle connector 89 has an upper block 90 with a recess 91 in its lower side for receiving the leaf spring 84, as shown in FIGURE 9. A lower block 92 rests upon the axle 93 of the truck trailer. A pin 94 is welded to the lower side of the leaf spring 84 and extends into a locator hole 95 in the lower block 92. A pair of U-bolts 97 and 98 extend around the axle 93 on opposite sides of the lower block 92 and through appropriate holes in the upper block 90. Nuts 99 and 100 are tightened onto the upper ends of the bolts 97 and 98 to tightly clamp the parts of the axle connector 89 together.

In use, this dolly assembly 20 is connected in conventional manner to a standard fifth wheel 101, as is indicated in dotted lines in FIGURE 3.

FIGURES 2 and 3 illustrate an adjustable torque rod assembly 102 having a shackle 103 threaded onto two rods 104 and 105. The rod 104 is pivotally connected by a pin 106 to a bracket 107. The bracket 107 is welded to the lower plate 23 of the beam 21. The other rod 105 is pivotally connected by a pin 108 to a bracket 109. The bracket 109 is welded to the axle 93. As is conventional, the shackle 103 can be rotated to adjust the tension of the torque rod assembly 102.

The dolly assembly has significant advantages in that the single I-beam 21 with the lightweight supporting bars 49 and 51 provides a reduced overall weight while still retaining the strength and rigidity required of the dolly, and permits a greater payload to be carried in the trailer. Of particular significance is the double arrangement of leaf springs 63 and 84. These are standard leaf springs commercially available for use on trailer suspensions. By providing the double leaf spring arrangement, greater load carrying strength is provided. However, at the same time, since the leaf springs are not separately connected to the I-beam 21 or to parts connected to it, they provide double the deflection that is achieved with a single leaf spring. Therefore, when the trailer carries a light load, the leaf springs are not so stiff as to give a rough ride to the trailer and transmit jars to the contents carried by the trailer. Thus, the double spring arrangement provides an easier ride.

The plates 80, 81, 87 and 88 help clamp the ends of the leaf springs 63 and 84 and prevent rotation of the shackle assemblies 68 and 69 under different kinds of load and motions.

Particularly on applications of the brakes, which tends to rotate the axle, the plates 80, 81, 87, and 88 resist such axle rotation and prevent axle hop and bounce. For heavier loads, the torque rod assembly 102 may be used in addition to the plates 80, 81, 87, and 88.

Various changes and modifications may be made within the purview of this invention as will be readily apparent to thise skilled in the art. Such changes and modifications are within the scope and teaching of this invention as defined by the claims appended hereto.

What is claimed is:

1. A dolly assembly for a truck trailer comprising a frame, a leaf spring assembly supported at opposite sides of the frame, each leaf spring assembly comprising upper and lower leaf spring means, the upper leaf spring means being curved with its concave side facing downwardly and the lower leaf spring means being curved with its concave side facing upwardly, the upper leaf spring means having a central portion clamped to the frame, the lower leaf spring means having a central portion clamped to the axle of the trailer, the forward ends of the upper and lower leaf spring means being connected to a common shackle assembly, the rearward ends of the upper and lower leaf spring means being connected to another common shackle assembly, the shackle assemblies being otherwise unconnected to the frame or the axle, each shackle assembly comprising a pair of vertically spaced bushings supported between side plates, the upper leaf spring means having ends wrapped around the upper bushings and the lower leaf spring means having ends wrapped around the lower bushings, and stops connected between the side plates and bearing against the leaf spring means for restricting rotation of the shackle assemblies.

2. The dolly assembly of claim 1 wherein the frame comprises a central I-beam and two side supporting rods, the side supporting rods and the central beam being connected together at their forward ends and being connected in spaced relation to a transverse rail at their rearward ends.

3. The dolly assembly of claim 2 including a pedestal assembly connected to each end of the body rail, a spring clamp connected to the pedestal assembly, the central portion of the upper leaf spring being held by the spring clamp.

4. The dolly assembly of claim 3 wherein the body rail comprises a hollow cylinder capable of acting as the air chamber for the trailer air brakes.

5. The dolly assembly of claim 1 including a torque rod assembly connected between the axle and the frame.

6. The dolly assembly of claim 5 including means to adjust the tension of the torque rod means.

7. A dolly assembly for a truck trailer comprising a frame, a leaf spring assembly supported at opposite sides of the frame, each leaf spring assembly comprising upper and lower leaf spring means, the upper leaf spring means having a central portion clamped to the frame, the lower leaf spring means having a central portion clamped to the axle of a trailer, the forward ends of the upper and lower leaf spring means being connected to a common shackle assembly, the rearward ends of the upper and lower leaf spring means being connected to another common shackle assembly, and stop means between the shackle assemblies and the leaf spring means to restrict rotation of the leaf spring means relative to the shackle assemblies and thereby restrict rotation of the axle even when the leaf spring assembly is substantially unloaded.

8. The dolly assembly of claim 7 wherein each shackle assembly comprises a pair of spaced vertical supports and a pair of vertically spaced bushings extending between the vertical supports, the upper leaf spring means having ends pivotally mounted on the upper bushings and the lower leaf spring means having ends pivotally mounted on the lower bushings, the stop means comprising plates fixed to the vertical supports in the paths of pivotal movement of the leaf spring means about the bushings.

References Cited

UNITED STATES PATENTS

| 2,264,174 | 11/1941 | Crump | 280—124 |
| 2,525,506 | 10/1950 | Wiedman | 280—124.1 |
| 462,330 | 11/1891 | Rumsey | 267—55 |
| 1,157,869 | 10/1915 | Hoeffle | 267—55 |

PHILIP GOODMAN, Primary Examiner

U.S. Cl. X.R.

267—55; 280—476